(12) United States Patent
Hatch

(10) Patent No.: US 6,988,733 B2
(45) Date of Patent: Jan. 24, 2006

(54) BONDED PTFE RADIAL SHAFT SEAL

(75) Inventor: Frederick Ronald Hatch, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 135 days.

(21) Appl. No.: 10/366,253

(22) Filed: Feb. 13, 2003

(65) Prior Publication Data
US 2004/0160016 A1 Aug. 19, 2004

(51) Int. Cl.
F16J 15/32 (2006.01)

(52) U.S. Cl. .................. 277/571; 277/549; 277/551; 277/559

(58) Field of Classification Search ............ 277/549, 277/551, 559, 571–573
See application file for complete search history.

(56) References Cited

U.S. PATENT DOCUMENTS

| | | |
|---|---|---|
| 3,549,445 A | 12/1970 | McMahon |
| 4,053,166 A | 10/1977 | Domkowski .......... 277/152 |
| 4,171,561 A | 10/1979 | Bainard et al. |
| 4,501,431 A | 2/1985 | Peisker et al. ......... 277/134 |
| 4,522,411 A | 6/1985 | Burgan ................ 277/134 |
| 4,578,856 A | 4/1986 | Butler ................. 29/451 |
| 4,613,143 A | 9/1986 | Butler ................ 277/134 |
| 4,623,153 A | 11/1986 | Nagasawa ............. 277/153 |
| 4,689,190 A | 8/1987 | Peisker et al. ......... 264/159 |
| 4,723,350 A | 2/1988 | Kobayashi et al. ....... 29/417 |
| 4,755,115 A | 7/1988 | Akaike ................ 418/104 |
| 4,957,680 A | 9/1990 | Saxod et al. ........... 264/161 |
| 4,969,653 A | 11/1990 | Breen ................. 277/134 |
| 5,013,052 A | 5/1991 | Butler et al. .......... 277/153 |
| 5,082,612 A | 1/1992 | Butler et al. .......... 264/138 |
| 5,106,565 A | 4/1992 | Saitoh ................ 264/263 |
| 5,183,271 A | 2/1993 | Wada et al. ........... 277/152 |
| 5,183,617 A | 2/1993 | Saitoh ................ 264/249 |
| 5,346,662 A | 9/1994 | Black et al. ........... 264/138 |
| 5,380,016 A | 1/1995 | Reinsma et al. ........ 277/152 |
| 5,460,678 A | 10/1995 | Reinsma et al. ........ 156/242 |
| 5,607,168 A | 3/1997 | Dahl ................. 277/152 |
| 2002/0158421 A1 | 10/2002 | Johnston |

FOREIGN PATENT DOCUMENTS

EP 1 024 318 A 8/2000

Primary Examiner—Enoch E. Peavey
(74) Attorney, Agent, or Firm—Howard & Howard

(57) ABSTRACT

A radial shaft seal having a metal casing and a rubber sealing portion attached interior of the metal casing. The rubber sealing portion is bonded to the metal casing during a forming operation. A polytetrafluoroethylene seal is stretched into a conical shape and bonded to the rubber sealing portion while in the stretched state.

19 Claims, 1 Drawing Sheet

BONDED PTFE RADIAL SHAFT SEAL

FIELD OF THE INVENTION

This invention relates to an improved PTFE radial shaft seal, and with more particularity the invention relates to an improved PTFE radial shaft seal that is bonded directly to an elastomeric rubber layer.

BACKGROUND OF THE INVENTION

Radial shaft seals that are designed for use in sealing the main rotating shaft of vehicle air conditioner compressors, superchargers, power steering pumps, and engine crankshafts may utilize multiple sealing elements designed such that a first sealing element facing the fluid or gas to be sealed is an elastomer. The elastomer generally has sufficient flexibility and resilience to provide a seal against the shaft. A second stiffer and more resistant sealing element is generally positioned behind and in tandem with the elastomeric seal such that an axial gap is provided between the sealing edge of the stiffer wear-resistant seal and the back sealing edge of the more resilient elastomeric sealing element. The second sealing element is generally made from a polytetrafluoroethylene (PTFE) or filled PTFE material.

Generally in the art, the different seal structures are typically assembled together and then are clamped together in a unit using a crimping and bonding process. In such a process, a rubber element is crimped between two metal casings to form a seal. The PTFE component is also typically crimped or bonded to the rubber component. It is known in the art to utilize a flat PTFE washer or preformed conical-shaped structure that is bonded or clamped to form the overall seal.

It is an object of this invention to provide a lower cost product and method by minimizing the material usage of a PTFE component. It is also an object to eliminate one of the metal casing structures required in various clamped sealed configurations, as well as to eliminate additional manufacturing steps that are currently utilized in the art.

SUMMARY OF THE INVENTION

A radial shaft seal including a metal casing, and a rubber sealing portion that is positioned interior of the metal casing. The rubber sealing portion is bonded to the metal casing during a forming and molding operation. A PTFE seal that has an outer diameter is bonded to the rubber sealing portion on an inner surface of the rubber sealing portion. The PTFE seal is stretched into a frusto-conical shape along its inner diameter and is bonded to the rubber sealing portion while the PTFE seal is in the stretched condition.

There is also disclosed a method of manufacturing a radial shaft seal comprising the steps of: stretching a PTFE seal about its inner diameter using a mandrel device, locating the stretched PTFE seal in a mold such that the PTFE seal engages a post surface of the mold, locating a metal casing within the mold, and then introducing a rubber elastomer into the mold and molding the rubber under pressure such that the metal casing and the PTFE seal in the stretched state are bonded to the rubber elastomer.

DESCRIPTION OF THE PREFERRED EMBODIMENTS

Figure 1:
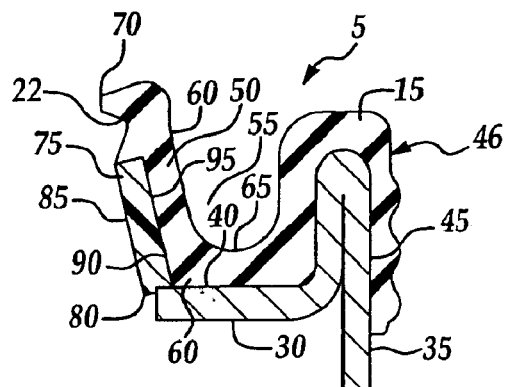
FIG. 1 is a sectional view of a first embodiment of the radial shaft seal of the present invention.

There is disclosed a radial shaft seal 5 comprising a metal casing 10, and a rubber sealing portion 15 positioned inside or interior of the metal casing 10. The rubber sealing portion 15 is bonded to the metal casing 10 at least partially along the surface of the metal casing. A polytetrafluoroethyene (PTFE) seal 20 having an outer diameter 25 is bonded to the rubber sealing portion 15 on an inner surface 95 of the rubber sealing portion 15. The PTFE seal 20 is stretched into a frusto-conical shape on its inner diameter 85 and is bonded to the rubber sealing portion 15 while the PTFE seal 20 is in the stretched condition.

With reference to FIG. 1, there is shown a first embodiment of a radial shaft seal 5 in accordance with the present invention. The radial shaft seal 5 includes a metal casing 10 having a radial portion 30 and an axial portion 35. Radial portion 30 and axial portion 35 are preferably formed such that they are approximately perpendicular to each other, although other configurational and angular relationships may be used without departing from the inventive aspect. As seen in FIG. 1, the axial portion 35 extends upward until it bends approximately 180° upon itself such that it continues parallel and downward and then bends at approximately 90° forming the radial portion 30.

The rubber sealing portion 15 preferably, comprises a rubber compound with sufficient modulus and elastic properties for use in a shaft seal. The rubber sealing portion 15 is bonded to the metal casing 10 along an inner surface 40 of the radial portion 30 and extends along an outer surface 45 of the axial portion 35. The rubber sealing portion 15 extending along the outer surface 45 of the axial portion 35 may contain ribs or raised protrusions 46. The rubber sealing portion 15 includes an angular portion 50 extending from the inner surface 40 of the radial portion 30. The angular portion 50 is bonded to the PTFE seal 20, which will be described in more detail below.

The rubber sealing portion 15 extends from the inner surface 40 of the radial portion 30 and includes a transition 55 from a planar portion 60 bonded to the inner surface 40 of the radial portion 30, to the angular portion 50 extending from the inner surface 40 of the radial portion 30. The transition 55 is defined by a first recess 65 formed in the rubber portion 30. The first recess 65 allows for the rubber portion 50 to flex when engaging a shaft. The rubber portion 15 may terminate at a sealing lip 70. The sealing lip 70, in a preferred embodiment acts as a first seal in a vehicle air conditioner compressor or other vehicle component facing the gas or fluid media to be sealed.

As stated above, the PTFE seal 20 is bonded to the rubber portion 15. The PTFE seal 20 includes first 75 and second 80 opposing ends spaced along inner 85 and outer 90 surfaces. The first end 75 of the PTFE seal is positioned proximate the sealing lip 70 of the rubber portion 15. The second end 80 of the PTFE seal 20 is preferably proximate the inner surface 40 of the radial portion 30 of the metal casing 10. The PTFE seal 20 is stretched from 5 to 120 percent of its original size, and even more preferably from 30 to 70 percent of its original size prior to introduction into a mold for bonding with the rubber portion 15. In this manner, the PTFE seal 20 is prestressed to return to its original state and thereby provides an increased sealing action against a shaft in contact with the radial shaft seal of the present invention. The PTFE seal 20 includes an outer surface 90 that is bonded to an inner surface 95 of the angular portion 50 of the rubber seal 15. As can be seen in FIG. 1, the PTFE seal 20 is positioned along the angular portion 50 of the rubber seal portion 15 such that the first end of the PTFE seal 20 is separated from the sealing lip by an axial gap 22.

Figure 2:
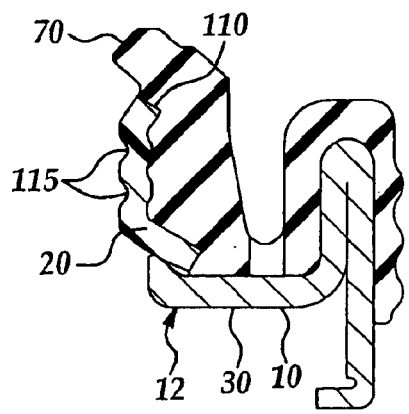
FIG. 2 is a sectional view of a second embodiment of the radial shaft seal of the present invention.

With respect to FIG. 2, there is shown a second embodiment of the radial shaft seal 5 of the present invention. The second embodiment includes a metal casing 10 and rubber sealing portion 15 bonded to the metal casing 10 similar to that of the first embodiment, with minor differences which will be detailed below. With reference to FIG. 2, it can be seen that the metal casing 10 includes an arcuate or bent portion 12 near the end 32 of the radial portion 30. The arcuate or bent portion 12 accommodates the second end 80 of the PTFE seal 20. In a preferred aspect, the PTFE seal 20 is bonded on the outer surface 90 to the rubber sealing surface portion 95. The inner surface 85 of the PTFE seal is not bonded to the arcuate or bent portion 12 of metal 10. In this manner, the PTFE seal 20 in the region of the bent portion 12 of metal casing 10 is allowed to float with respect to the metal casing 10. This allows for the PTFE seal to be securely bonded to the rubber portion 20 without being conflictingly bonded to the metal casing 10.

In another aspect of the second embodiment, the PTFE seal 20 includes grooves 115 formed on an inner surface 85 of the PTFE seal 20. The grooves 115 are formed into the PTFE seal 20 during rubber molding and provide hydrodynamic pumping and/or static sealing action against a shaft engaged by the radial shaft seal 5. The PTFE seal 20 also preferably includes support portions 110 formed on the first 75 and second 80 ends of the PTFE seal 20. The support portions 110 are angled into the rubber portion 15 and provide an anti-extrusion support of the rubber sealing portion 15 when placed under high pressure. With reference to FIG. 2, support sections 110 are on both the first 75 and second 80 ends of the PTFE seal 20. However, the PTFE seal 20 may include support portions 110 formed on either of the first 75 or second 80 ends individually or in combination.

Figure 3:
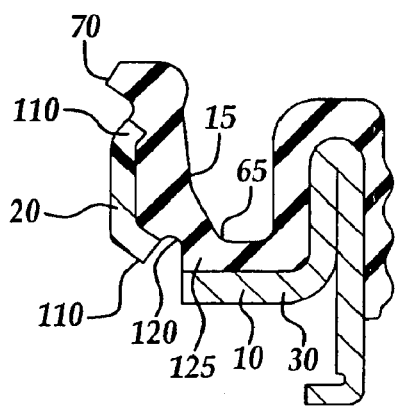
FIG. 3 is a sectional view of a third embodiment of the radial shaft seal of the present invention.

With reference to FIG. 3, there is shown a third embodiment of the radial shaft seal 5 of the present invention. The third embodiment preferably includes support portions 110 on the PTFE seal 20 as previously described with reference to the second embodiment. Again, the support portions 110 reduce the potential of the elastomeric rubber to extrude under high pressure and also reduce wear of the PTFE seal 20. However, in the third embodiment the metal casing 10 preferably does not include the arcuate or bent portion 12 as previously described with reference to the second embodiment. The rubber sealing portion 15 of the third embodiment includes a second recess 120 formed opposite the first recess 65 for providing a flex area 125 for the rubber sealing portion 15. In this manner, the rubber sealing portion 15 has more flexibility when engaging a shaft.

Figure 4:
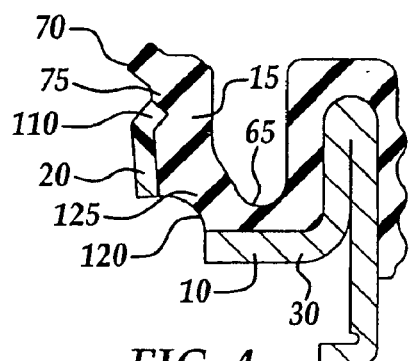
FIG. 4 is a sectional view of a fourth embodiment of the radial shaft seal of the present invention.

With reference to FIG. 4, there is shown a fourth embodiment of the radial shaft seal 5 of the present invention. The fourth embodiment preferably includes a PTFE seal 20 that has a support portion 110 on its first end 75 proximate the sealing lip 70, but does not include a support portion 110 on the second end 80 proximate the radial portion 30 of the metal casing 10. The rubber sealing portion 15, however, does include the second recess 120 as previously described with reference to the third embodiment. In all other aspects, the fourth embodiment is similar to that of the first, second and third embodiments.

The PTFE seal 20 may be positioned closer to the sealing lip 70 of the rubber sealing portion 15 such that the first end 75 of the PTFE seal 20 provides a bridging support, due to its higher stiffness and strength thereby strengthening the engagement of the sealing lip 70. It is to be understood that moving the PTFE seal 20 closer to or proximate the sealing lip 70 may be utilized in any of the previous four embodiments outlined above.

Figure 6:
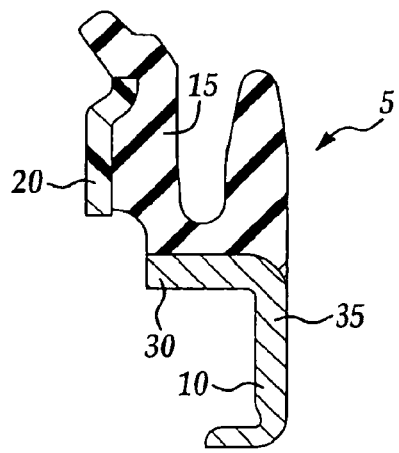
FIG. 6 is a sectional view of a fifth embodiment of the radial shaft seal of the present invention.

With reference to FIG. 6 there is shown a sixth embodiment of a radial shaft seal 5 in accordance with the present invention. The radial shaft seal 5 includes a metal case 10 having a radial portion 30 and axial portion 35. Radial portion 30 and axial portion 35 are formed such that they are approximately perpendicular to each other.

As seen in FIG. 6, the axial portion 35 extends upward and then bends inwardly at approximately 90° forming the radial portion 30.

There is also disclosed as an aspect of the invention, a method of manufacturing a radial shaft seal 5 comprising the steps of: stretching a PTFE seal 20 about its inner diameter 85 utilizing a mandrel device, locating the stretched PTFE seal 20 in a mold such that the PTFE seal 20 engages a post surface of the mold, locating the metal casing 10 within the mold, and thereafter introducing a rubber elastomer into the mold and molding the rubber under pressure such that the metal casing 10 and PTFE seal 20 in the stretched state are bonded to the rubber elastomer.

Figure 5:
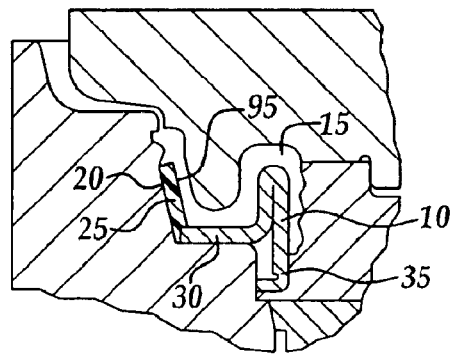
FIG. 5 is a sectional view detailing the radial shaft seal positioned within a mold utilized to form and mold the radial shaft seal of the present invention.

With reference to FIG. 5, the radial shaft seal 5 of the present invention is depicted in a mold. The PTFE seal 20 is initially in a flat washer-like state and is stretched to the conical form shown in the figure by preferably lowering a plunger along a mandrel to expand the inner diameter 85 and end 75 of the PTFE seal 20. The outer diameter 95 is expanded as it glides downward along the mandrel. The plunger preferably includes expandable fingers which widen as the plunger is lowered, while pushing the PTFE washer 20 or seal along the mandrel length. The mandrel preferably fits over a portion of the tool utilized to mold the rubber material. In a preferred aspect, fingers of a pushing mechanism are utilized to guide the stretched PTFE seal 20 onto the tooling such that the inner diameter of the PTFE seal 20 is stretched from 5 to 180 percent of its original size, and more preferably in the range of 5 to 120 percent. The PTFE seal is maintained in the stretched or stressed condition prior to molding with the elastomeric rubber material. Either before or after the stretched PTFE seal is located within the mold, the metal casing is placed within the mold and a rubber elastomer is introduced into the mold and allowed to cure under elevated pressure and temperature to form the radial shaft seal 5 of the present invention. By maintaining the PTFE seal 20 in its stressed or its stretched condition, significant savings can be made by providing a radial shaft seal that utilizes less PTFE, as well as eliminates the additional metal casing typically found in crimped designs.

While the invention has been described with reference to certain preferred embodiments, a worker in this art would realize changes can be made without departing from the inventive aspect. Therefore, one is referred to the following claims to determine the scope of the invention.

What is claimed is:

1. A radial shaft seal comprising:

a rigid casing;

a rubber sealing portion positioned interior of the rigid casing, the rubber sealing portion bonded to the rigid casing;

a polytetrafluoroethylene seal having an inner diameter, the polytetrafluoroethylene seal being bonded to the rubber sealing portion on an inner surface of the rubber sealing portion; and the polytetrafluoroethylene seal being stretched into a frusto-conical shape on the inner diameter and wherein the polytetrafluoroethylene seal is bonded to the rubber sealing portion while the polytetrafluoroethylene seal is in the stretched condition and maintained in said stretched condition under tension following bonding.

2. The radial shaft seal of claim 1 wherein the rigid casing includes a radial portion and an axial portion.

3. The radial shaft seal of claim 1 wherein the rubber sealing portion is bonded to the rigid casing at least along an inner surface of the radial portion and may also extend along an outer surface of the axial portion.

4. The radial shaft seal of claim 1 wherein the rubber sealing portion includes an angular portion extending from the inner surface of the radial portion.

5. The radial shaft seal of claim 1 wherein the rubber sealing portion includes a transition from a planar portion bonded to the inner surface of the radial portion to the angular portion, the transition defined by a first recess formed in the rubber sealing portion.

6. The radial shaft seal of claim 1 wherein the angular portion of the rubber sealing portion terminates at a sealing lip.

7. The radial shaft seal of claim 1 wherein the polytetrafluoroethylene seal includes first and second opposing ends spaced along outer and inner surfaces.

8. The radial shaft seal of claim 1 wherein the first end is proximate the sealing lip and the second end is proximate the inner surface of the radial portion of the rigid casing.

9. The radial shaft seal of claim 1 wherein the outer surface of the polytetrafluoroethylene seal is bonded to an inner surface of the angular portion.

10. The radial shaft seal of claim 1 wherein radial portion of the rigid casing includes an arcuate portion that terminates at a first end of the polytetrafluoroethylene seal.

11. The radial shaft seal of claim 1 wherein the polytetrafluoroethylene seal is bonded on its outer surface to the rubber sealing portion and wherein the inner surface of the polytetrafluoroethylene seal is not bonded to the arcuate metal portion.

12. The radial shaft seal of claim 1 wherein the polytetrafluoroethylene seal includes a support portion formed on a first end, the support portion angled into the rubber sealing portion.

13. The radial shaft seal of claim 1 wherein the polytetrafluoroethylene seal includes a support potion formed on a second end, the support portion angled into the rubber sealing portion.

14. The radial shaft seal of claim 1 wherein the polytetrafluoroethylene seal includes support potions formed on the first and second ends, the support portions angled into the rubber sealing portion.

15. The radial shaft seal of claim 1 wherein the polytetrafluoroethylene seal includes hydrodynamic or static sealing grooves formed on the inner surface of the polytetrafluoroethylene seal.

16. The radial shaft seal of claim 1 wherein the first end of the polytetrafluoroethylene seal is positioned proximate the sealing lip of the rubber sealing portion such that the polytetrafluoroethylene seal provides a bridging support to the sealing lip.

17. The radial shaft seal of claim 1 wherein the rubber sealing portion includes a second recess formed opposite the first recess for providing a flex area for the rubber sealing portion.

18. A method of manufacturing a radial shaft seal comprising the steps of:

stretching a polytetrafluoroethylene seal about its inner diameter utilizing a mandrel device, locating the stretched polytetrafluoroethylene seal in a mold such that the polytetrafluoroethylene seal engages a post surface of the mold;

locating a rigid casing within the mold;

introducing a rubber elastomer into the mold and thereafter molding the rubber under heat and pressure such that the rigid casing and polytetrafluoroethylene seal in a stretched state are bonded to the rubber elastomer.

19. The method of claim 18 wherein the polytetrafluoroethylene seal is stretched from 5 to 120 percent of its original size.

\* \* \* \* \*

UNITED STATES PATENT AND TRADEMARK OFFICE
CERTIFICATE OF CORRECTION

PATENT NO.        : 6,988,733 B2
APPLICATION NO. : 10/366253
DATED             : January 24, 2006
INVENTOR(S)      : Frederick Ronald Hatch It is certified that error appears in the above-identified patent and that said Letters Patent is hereby corrected as shown below:

| Column | Line |                                      |
|--------|------|--------------------------------------|
| 6      | 9    | Replace "potion" with -- portion --  |
| 6      | 13   | Replace "potions" with -- portions --|

Signed and Sealed this

Second Day of January, 2007

JON W. DUDAS
*Director of the United States Patent and Trademark Office*